US012742691B2

(12) United States Patent
Sweeney et al.

(10) Patent No.: US 12,742,691 B2
(45) Date of Patent: Sep. 22, 2026

(54) POST-PROCESSING METHOD TO EXTEND THE FUNCTIONAL RANGE OF OPTICAL BACKSCATTER REFLECTOMETRY IN EXTREME ENVIRONMENTS

(71) Applicant: UT-Battelle, LLC, Oak Ridge, TN (US)

(72) Inventors: Daniel C. Sweeney, Oak Ridge, TN (US); Christian M. Petrie, Oak Ridge, TN (US); Adrian M. Schrell, Oak Ridge, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 354 days.

(21) Appl. No.: 18/388,685

(22) Filed: Nov. 10, 2023

(65) Prior Publication Data

US 2024/0094063 A1 Mar. 21, 2024

Related U.S. Application Data

(63) Continuation of application No. 17/306,113, filed on May 3, 2021, now abandoned.
(Continued)

(51) Int. Cl.
*G01K 11/3206* (2021.01)
*G01D 5/353* (2006.01)
(Continued)

(52) U.S. Cl.
CPC ..... *G01K 11/3206* (2013.01); *G01D 5/35358* (2013.01); *G01D 5/35361* (2013.01);
(Continued)

(58) Field of Classification Search
CPC ............... G01K 11/3206; G01K 11/32; G01D 5/35358; G01D 5/35361; G01D 5/35393; G01D 5/35306; G01D 5/35329
See application file for complete search history.

(56) References Cited

U.S. PATENT DOCUMENTS 9,347,826 B2 * 5/2016 Wen ........................ G01L 1/246
9,945,717 B2 * 4/2018 Lewis ...................... G01D 1/02
(Continued)

OTHER PUBLICATIONS

Jia Song, Wenhai Li, Ping Lu, Yanping Xu, Liang Chen, and Xiaoyi Bao. Long-range high spatial resolution distributed temperature and strain sensing based on optical frequency-domain reflectometry. IEEE Photonics Journal, 6(3):1-8, 2014.
(Continued)

*Primary Examiner* — Laura Martin
*Assistant Examiner* — Philip L Cotey
(74) *Attorney, Agent, or Firm* — WARNER NORCROSS + JUDD LLP

(57) ABSTRACT

A system including a data processing apparatus and a memory is disclosed. The data processing apparatus is communicatively coupled with an optical frequency domain reflectometry (OFDR) system, and the memory is communicatively coupled with the data processing apparatus. The memory encodes instructions that, when executed by the data processing apparatus, cause the data processing apparatus to (a) receive, from the OFDR system, a timed sequence of backscattered light spectra associated with each segment of an optical fiber and (b) determine, for each optical-fiber segment, a set of values of a temperature or strain of the optical fiber segment. Determining the set of values for each optical-fiber segment includes selecting a reference spectrum, determining a spectral shift between the backscattered-light spectrum and the reference spectrum, and determining a value of the temperature or the strain of the optical-fiber segment based on the spectral shift.

7 Claims, 9 Drawing Sheets
(5 of 9 Drawing Sheet(s) Filed in Color)

Related U.S. Application Data

(60) Provisional application No. 63/021,358, filed on May 7, 2020.

(51) Int. Cl.
*G01K 11/32* (2021.01)
*G01K 7/16* (2006.01)

(52) U.S. Cl.
CPC ......... *G01D 5/35393* (2013.01); *G01K 11/32* (2013.01); *G01D 5/35306* (2013.01); *G01D 5/35329* (2013.01); *G01K 2007/166* (2013.01)

(56) References Cited

U.S. PATENT DOCUMENTS

| | | | | |
|---|---|---|---|---|
| 10,670,802 | B2 * | 6/2020 | Chen | G02B 6/02204 |
| 10,871,406 | B2 * | 12/2020 | Koizumi | G01J 5/58 |
| 11,150,083 | B2 * | 10/2021 | Huang | G01L 1/242 |
| 2008/0212082 | A1 * | 9/2008 | Froggatt | G01D 5/3539 356/73.1 |
| 2010/0128284 | A1 * | 5/2010 | Riza | G01B 9/0209 356/519 |
| 2011/0228255 | A1 * | 9/2011 | Li | G01B 11/18 356/32 |
| 2011/0317148 | A1 * | 12/2011 | Froggatt | G01L 1/242 356/477 |
| 2015/0168289 | A1 * | 6/2015 | Magne | G01B 11/16 356/32 |
| 2017/0052041 | A1 * | 2/2017 | Cedilnik | G01M 11/3118 |
| 2017/0199075 | A1 * | 7/2017 | Lewis | G01D 5/35361 |
| 2017/0307474 | A1 * | 10/2017 | Thévenaz | G01M 11/3172 |
| 2018/0356203 | A1 * | 12/2018 | Froggatt | G01B 9/02004 |
| 2019/0072437 | A1 * | 3/2019 | Ohodnicki | H01F 27/402 |
| 2019/0234726 | A1 * | 8/2019 | Gifford | G01L 1/242 |
| 2020/0103258 | A1 * | 4/2020 | Iwamura | G01D 5/35358 |
| 2021/0190550 | A1 * | 6/2021 | Handerek | G01D 5/35361 |

OTHER PUBLICATIONS

Thomas William Wood, Bryan Blake, Thomas E Blue, Christian Matthew Petrie, and David Hawn. Evaluation of the performance of distributed temperature measurements with single-mode fiber using rayleigh backscatter up to 1000° C. IEEE Sensors Journal, 14(1):124-128, 2013.
Alexander K Sang, Mark E Froggatt, Dawn K Gifford, and Bryan D Dickerson. One centimeter spatial resolution temperature measurements from 25 to 850 c using rayleigh scatter in gold coated fiber. In Conference on Lasers and Electro-Optics, page JTuA77. Optical Society of America, 2007.
Ryan Regier and Neil A Hoult. Distributed strain behavior of a reinforced concrete bridge: Case study. Journal of Bridge Engineering, 19(12):05014007, 2014.
Alex K Sang, Mark E Froggatt, Dawn K Gifford, Stephen T Kreger, and Bryan D Dickerson. One centimeter spatial resolution temperature measurements in a nuclear reactor using rayleigh scatter in optical fiber. IEEE Sensors Journal, 8(7):1375-1380, 2008.
KP Koo and AD Kersey. Bragg grating-based laser sensors systems with interferometric interrogation and wavelength division multiplexing. Journal of Lightwave Technology, 13(7):1243-1249, 1995.
Mark Froggatt and Jason Moore. Distributed measurement of static strain in an optical fiber with multiple bragg gratings at nominally equal wavelengths. Applied Optics, 37(10):1741-1746, 1998.
Gui Xin, Li Zhengying, Wang Fan, Wang Yiming, Wang Changjia, Zeng Siyue, and Yu Haihu. Distributed sensing technology of high-spatial resolution based on dense ultra-short fbg array with large multiplexing capacity. Optics Express, 25(23):28112-28122, 2017.
Neil A Hoult, Omurden Ekim, and Ryan Regier. Damage/deterioration detection for steel structures using distributed fiber optic strain sensors. Journal of Engineering Mechanics, 140(12):04014097, 2014.
Lisa N Wheeler, Eric Pannese, Neil A Hoult, W Andy Take, and Hoat Le. Measurement of distributed dynamic rail strains using a rayleigh backscatter based fiber optic sensor: Lab and field evaluation. Transportation Geotechnics, 14:70-80, 2018.
Daichi Wada, Hirotaka Igawa, and Tokio Kasai. Vibration monitoring of a helicopter blade model using the optical fiber distributed strain sensing technique. Applied Optics, 55(25):6953-6959, 2016.
Shaoquan Wang, Kaspar Lasn, Christer Westum Elverum, Di Wan, and Andreas Echtermeyer. Novel in-situ residual strain measurements in additive manufacturing specimens by using the optical backscatter reflectometry. Additive Manufacturing, p. 101040, 2020.
Yang Du, Tiegen Liu, Zhenyang Ding, Qun Han, Kun Liu, Junfeng Jiang, Qinnan Chen, and Bowen Feng. Cryogenic temperature measurement using rayleigh backscattering spectra shift by ofdr. IEEE Photonics Technology Letters, 26(11):1150-1153, 2014.
Brian J Soller, Dawn K Gifford, Matthew S Wolfe, and Mark E Froggatt. High resolution optical frequency domain reflectometry for characterization of components and assemblies. Optics Express, 13(2):666-674, 2005.
Ionut, D Aron and Pascal Van Hentenryck. On the complexity of the robust spanning tree problem with interval data. Operations Research Letters, 32(1):36-40, 2004.
P Healey. Statistics of rayleigh backscatter from a single-mode optical fibre. Electronics Letters, 461 21(6):226-228, 1985.
Masataka Nakazawa. Rayleigh backscattering theory for single-mode optical fibers. JOSA, 73(9):1175-463 1180, 1983.
Soren Heinze and Andreas T Echtermeyer. A running reference analysis method to greatly improve optical backscatter reflectometry strain data from the inside of hardening and shrinking materials. Applied Sciences, 8(7):1137, 2018.
Christian M Petrie, Niyanth Sridharan, Mohan Subramanian, Adam Hehr, Mark Norfolk, and John Sheridan. Embedded metallized optical fibers for high temperature applications. Smart Materials and Structures, 28(5):055012, 2019.
Kelly M McCary, Brandon Wilson, Joshua Daw, Pattrick Calderoni, Christian Petrie, Thomas Blue, et al. In-pile ofdr sensing with fiber bragg gratings in sapphire optical fiber. American Nuclear Society Transactions, 121(1):159-163, 2019.
Mark Froggatt and Jason Moore. High-spatial-resolution distributed strain measurement in optical fiber with rayleigh scatter. Applied Optics, 37(10):1735-1740, 1998.
Alan J Rogers and Vincent A Handerek. Frequency-derived distributed optical-fiber sensing: Rayleigh backscatter analysis. Applied Optics, 31(21):4091-4095, 1992.
KO Hill. Aperiodic distributed-parameter waveguides for integrated optics. Applied Optics, 13(8):1853-1856, 1974.
Wf Eickhoff and Rf Ulrich. Optical frequency domain reflectometry in single-mode fiber. Applied Physics Letters, 39(9):693-695, 1981.
Stephen T Kreger, Alex K Sang, Dawn K Gifford, and Mark E Froggatt. Distributed strain and temperature sensing in plastic optical fiber using rayleigh scatter. In Fiber Optic Sensors and Applications VI, vol. 7316, p. 73160A. International Society for Optics and Photonics, 2009.
Luna Technologies. Optical Backscatter Reflectometer 4600 User Guide, 2013.
Geert Luyckx, Eli Voet, Nicolas Lammens, Wim De Waele, and Joris Degrieck. Residual strain-induced birefringent fbgs for multi-axial strain monitoring of cfrp composite laminates. NDT & E International, 54:142-150, 2013.
Yoji Okabe, Shigeki Yashiro, Ryohei Tsuji, Tadahito Mizutani, and Nobuo Takeda. Effect of thermal residual stress on the reflection spectrum from fiber bragg grating sensors embedded in cfrp laminates. Composites Part A: Applied Science and Manufacturing, 33(7):991-999, 2002.
MS Milczewski, Jean CC da Silva, I Abe, Lidia Carvalho, C Fernandes, Hypolito Jose Kalinowski, and RN Nogueira. Fbg application in the determination of setting expansion of dental materials. In 17th International Conference on Optical Fibre Sensors, vol. 5855, pp. 387-390. International Society for Optics and Photonics, 2005.
R Le Parc, B Champagnon, Ph Guenot, and S Dubois. Thermal annealing and density fluctuations in silica glass. Journal of non-crystalline solids, 293:366-369, 2001.

(56) References Cited

OTHER PUBLICATIONS

Christian M Petrie, Niyanth Sridharan, Adam Hehr, Mark Norfolk, and John Sheridan. High-temperature strain monitoring of stainless steel using fiber optics embedded in ultrasonically consolidated nickel layers. Smart Materials and Structures, 28(8):085041, 2019.

William Primak. Fast-neutron-induced changes in quartz and vitreous silica. Physical Review, 110(6):1240, 1958.

Christian M Petrie, Anthony Birri, and Thomas E Blue. High-dose temperature-dependent neutron ir-radiation effects on the optical transmission and dimensional stability of amorphous fused silica. Journal of Non-Crystalline Solids, 525:119668, 2019.

B. A. Wilson, B. Reinke, C. Petrie, and T. E. Blue. "Distributed temperature measurements using optical fiber in the OSU nuclear reactor,". Trans. Am. Nucl. Soc., 113(1):pp. 464-466, 2015.

* cited by examiner

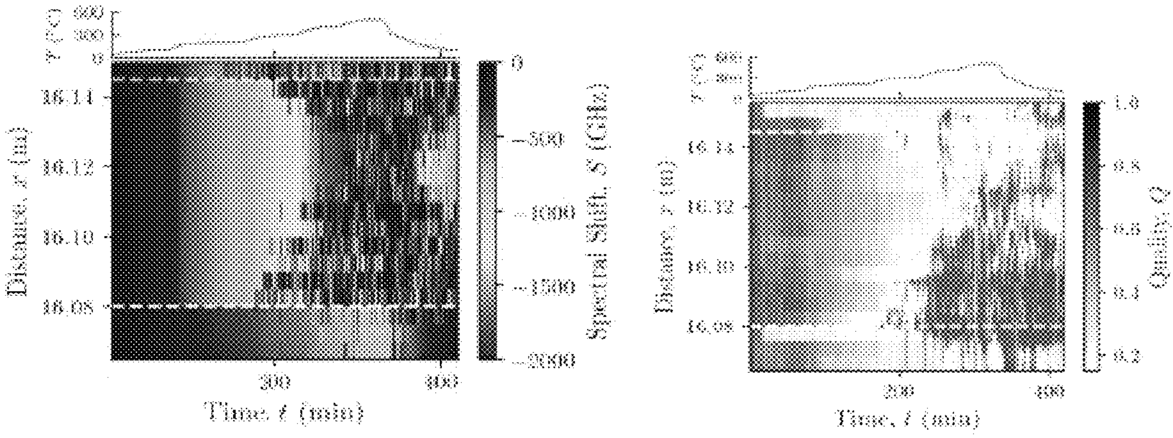
FIG. 12A
FIG. 12B
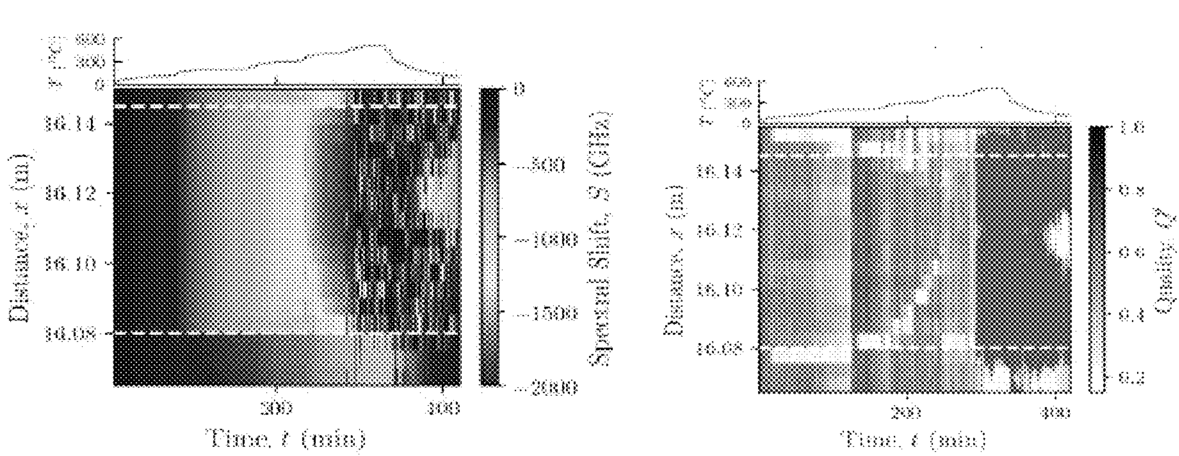
FIG. 12C
FIG. 12D

Algorithm 1 Inchworm algorithm

```
procedure INCHWORM(scan_list, p, ζ):
    a ← 0                                            ▷ Initialize reference variables
    S ← [[0, 0, ..., 0]] * N          ▷ Position-dependent spectral shifts relative to scan 0 (S_{0,n}(x))
    for n = 1, n ≤ N, n + + do:
        I_a(x) ← scan_list[a]     ▷ Position x-dependent measurement intensities (Ī(x)) for scans a and n
        I_n(x) ← scan_list[n]
        Calculate (S_{a,n}(x), Q'_{a,n}(x)) using I_a(x) and I_n(x)
        if min(Q'_{a,n}(x)) < ζ then:
            for i = 1, i < n − p, i + + do:
                a = n − i                         ▷ i = 1 is equivalent to a running reference
                I_a(x) ← scan_list[a]
                Calculate (S_{a,n}(x), Q'_{a,n}(x)) using I_a(x) and I_n(x)
                if min(Q'_{a,n}(x)) > ζ then
                    S[n, :] ← S_{a,n}(x) + S[a, :]           ▷ Store acceptable quality measurement
                    break
                else if n − i − 1 = p then:
                    S[n, :] ← S_{a,n}(x) + S[a, :] ▷ Store measurement. Equivalent to static reference if p = 0
        else
            S[n, :] ← S_{a,n}(x) + S[a, :]    ▷ Store acceptable quality measurement and maintain reference
    return S
```

FIG. 14

POST-PROCESSING METHOD TO EXTEND THE FUNCTIONAL RANGE OF OPTICAL BACKSCATTER REFLECTOMETRY IN EXTREME ENVIRONMENTS

CROSS REFERENCE TO RELATED APPLICATIONS

This application is a continuation of U.S. patent application Ser. No. 17/306,113, filed May 3, 2021, which claims priority to U.S. Provisional Application 63/021,358, filed May 7, 2020, the disclosures of which are incorporated by reference in their entirety.

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in the invention.

FIELD OF INVENTION

The present invention relates to sensors, and more particularly to systems and methods for optical backscatter reflectometry ("OBR") and optical frequency domain reflectometry ("OFDR").

BACKGROUND OF THE INVENTION

Backscatter reflectometry measurements, known more generally as optical frequency domain reflectometry (OFDR) measurements, are based on interference patterns generated by the Rayleigh backscatter of light launched from a tunable laser source (TLS). The backscattered light is reflected by small imperfections within an optical fiber that result from random density fluctuations along the length of the fiber. The nature of these fluctuations and the resulting interference pattern generated by the backscattered light make them unique to a given fiber. Furthermore, assuming the light injection conditions remain unchanged, the Rayleigh backscatter "signature" of any given fiber remains fundamentally unchanged except for shifts that occur as the fiber's optical spectrum, which is locally compressed or expanded due to changes in strain and temperature. The stability of the Rayleigh backscatter signature allows for quasi-continuous spatially distributed temperature and strain sensing. This is done by measuring the spectral shifts along a length of optical fiber relative to a reference scan. Quantification of the spectral shift is typically achieved using a cross-correlation operation. In this way, Rayleigh backscatter can be used in ordinary singlemode optical fibers to make spatially distributed OFDR measurements; this is similar to the method that has historically been implemented using wavelength division multiplexing of fiber Bragg gratings (FBGs). In the past few decades, many OFDR-based measurements of temperature and strain using Rayleigh backscatter in ordinary singlemode optical fibers have been extended to a wide range of applications.

OFDR measurements using Rayleigh backscatter interference profiles rely on accurate measurement of the local, spatially resolved spectral shifts that occur between a target or active scan and a reference scan. The traditional approach is to use a single reference, herein referred to as a static reference approach, during the post-processing of an entire OFDR data set (See FIG. 1). This approach is advantageous because it enables each target scan to be compared directly with a single reference scan, and it minimizes the propagation of error that would otherwise be introduced if the reference were to change. However, the static reference approach has two major limitations. First, large strains can cause the spectral shift to extend beyond the range allowed by the reference scan. The integration bounds of the cross-correlation function are dictated by the available frequency band of the TLS, which will be shown later. In these cases, the cross-correlation of the target and reference scans would not necessarily result in a prominent peak, and the spectral shift would not be accurately resolved. In the absence of plastic flow in the glass fiber, the spectral shifts resulting from large strains are reversible. In such cases, adequate a priori knowledge of the experimental conditions to which the optical fiber will be exposed may be sufficient to ensure that the strain will not exceed the integration range specified for a particular portion of the fiber. However, the traditional static reference approach is incapable of resolving the strain once it exceeds this cross-correlation integration range.

The second limitation of the static reference approach is that it can have difficulties resolving spectral shifts during a slow manipulation of the Rayleigh backscatter profile. These shifts occur over time and are caused by physical processes such as displacement damage resulting from neutron irradiation to a total fluence on the order of $8 \times 10^{17}$ n/cm$^2$, or annealing at high temperatures in the range of 600-800° C. Each of these processes involves the gradual alteration of the fiber's microstructure that changes how light is reflected. These microstructural changes may or may not be permanently retained once the fiber under test is returned to its reference state. However, the scan of a fiber with an altered microstructure can be sufficiently different from its reference scan, so the cross-correlation would not yield a well-defined peak, making it difficult to directly compare the spectral features of the Rayleigh backscatter. This limits the application of OFDR sensors in harsh environments, including those with high temperatures and neutron radiation, as these processes slowly alter the microstructure and obfuscate the similarity between a later scan and the original static reference.

Recently, an alternative approach was suggested for determining the strain in an optical fiber sensor using OFDR during curing of an embedded fiber optic sensor in a hardening epoxy. This method uses a running reference scheme in which, as each measurement is taken, the previous scan is used as a reference to calculate spectral shift (FIG. 2). The integrated spectral shift for each measurement is then determined through the cumulative sum of the differential spectral shifts up to the measurement scan of interest. The running reference method has been demonstrated to resolve large strains beyond the capabilities of the static reference method, but at the cost of increasing the error propagation to its maximum—proportional to the square root of the number of scans in the data set. This problem with error propagation becomes particularly pronounced when a single aberrant scan results in large inaccuracies that continue to grow with each consecutive measurement.

SUMMARY OF THE INVENTION

The present invention provides a system and method for determining an object characteristic through adaptive post-processing of a timed sequence of measurements of a measured characteristic. The system implements a post-processing method that includes a comparison between each measurement of the measured characteristic and a variable reference, where the variable reference used in making the comparison for each given measurement of the measured characteristic is selected based on a quality metric that reflects the degree of correlation between the measured characteristic and each potential variable reference. In one embodiment, the variable reference is selected from one of the prior measurements of the measured characteristic. In one embodiment, the system sequentially assesses the quality value of each of the prior measurements of the measured characteristic until a prior measurement is found with a quality value (or quality metric) that meets or exceeds a target-quality value. The first prior measurement to be found with a quality value that meets or exceeds the target-quality value is used as the variable reference. The object characteristic is then computed as a function of the difference between the measured characteristic and that obtained from the variable reference.

In one embodiment, the system sequentially assesses the quality metric of all (or a subset) of the prior measurements of the measured characteristic and selects the prior measurement with the highest qualify metric as the variable reference.

In one embodiment, the system is integrated into an optical backscatter reflectometry system that includes a fiber optic sensor. In one embodiment, the optical backscatter reflectometry system is a distributed sensing system and the system is configured to determine the object characteristic associated with one or more select portions of the fiber optic. In embodiments that incorporate a fiber optic sensor, the measured characteristic may be a scan of OFDR measurements performed over a spatial extension corresponding to a select portion of the optical fiber. In one embodiment, the second characteristic of the optical fiber includes one of temperature of the portion of the optical fiber or strain in the portion of the optical fiber.

In one aspect, the present invention provides a system for determining a characteristic of a physical medium, the system having a data processing apparatus communicatively coupled with a sensor configured to measure a first characteristic of a physical medium; and memory communicatively coupled with the data processing apparatus. The memory encodes instructions that, when executed by the data processing apparatus, cause the system to perform operations including: receiving, from the sensor, a timed sequence of measurements of the first characteristic of the physical medium; and determining a set of values of a second characteristic of the physical medium corresponding to the timed sequence of the first characteristic's measurements, wherein the set of second characteristic's values is determined by performing, for each measurement of the timed sequence, operations including: determining a quality value for the measurement based on a reference measurement selected from among earlier measurements of the timed sequence, wherein the reference measurement is selected by iterating through the earlier measurements, starting with the first measurement, until the quality value meets or exceeds a target-quality value, determining a change of the measurement relative to the reference measurement, and determining a value of the second characteristic of the physical medium based on the measurement's change.

In an alternative embodiment, the reference measurement is selected by iterating through a plurality of earlier measurements, for example, all of the earlier measurements or a select subset of the earlier measurements, and then selecting as the reference measurement the earlier measurement with the highest quality value.

In one embodiment, determining the quality value (or quality metric) for the measurement based on the reference measurement includes calculating a correlation between the measurement and the reference measurement.

In one embodiment, determining the change of the measurement relative to the reference measurement includes calculating a shift of the measurement relative to the reference measurement.

In one embodiment, the sensor comprises an optical fiber. In such embodiments, the physical medium may include a portion of the optical fiber extending along the longitudinal axis of the optical fiber. In one embodiment, the measurement of the first characteristic of the optical fiber includes a scan of OFDR measurements performed over a spatial extension corresponding to the portion of the optical fiber. In one embodiment, the second characteristic of the optical fiber includes one of temperature of the portion of the optical fiber or strain in the portion of the optical fiber.

In one embodiment, determining the change of the measurement relative to the reference measurement includes calculating a spectral shift.

In one embodiment, the optical fiber may be disposed in a harsh environment that includes one or more of high temperature, neutron irradiation, or aerospace.

In one embodiment, the data processing apparatus is implemented as one of a microprocessor, an FPGA, or an ASIC.

The present invention provides improved understanding of measurements over a greater functional range through the implementation of an adaptive post-processing method that uses a variable reference selected based on a quality metric. The use of a quality metric allows the system to select a variable reference that maintains a quality threshold and does not blindly rely on a static reference or an ever-changing running reference. In use, the adaptive post-processing method provides improved accuracy over existing static reference and running reference post-processing methods. The present invention also results in generally higher quality spectral shift measurements. These improvements are demonstrated especially well for optical fiber sensors deployed in environments that slowly affect their microstructures through processes such as high-temperature annealing and neutron irradiation. Furthermore, the inchworm method was developed to be a drop-in replacement for post-processing OFDR data acquired using conventional optical backscatter reflectometers, such as Luna Innovations OBR 4600 system, but the present invention can be readily implemented for use with other similar systems to improve their functional measurement range through sophisticated post processing.

These and other features of the invention will be more fully understood and appreciated by reference to the description of the embodiments and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components. Any reference to claim elements as "at least one of X, Y and Z" is meant to include any one of X, Y or Z individually, and any combination of X, Y and Z, for example, X, Y, Z; X, Y; X, Z; and Y, Z.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 12A-D is a set of graphs that allow comparison of the spectral shifts and quality measurements performed on high strain data using the static reference method against those of an embodiment of the present invention.

FIG. 14 is pseudocode for implementing an inchworm algorithm in accordance with one embodiment of the present invention.

DESCRIPTION OF CURRENT EMBODIMENTS

A. Overview

Optical backscatter reflectometry ("OBR") measures the light spectrum reflected by small variations in the material properties of an optical fiber to determine spatially distributed strain ($\varepsilon$) or temperature (T). In a typical system, OBR data is recorded during an experiment and processed separately to determine relative spectral shifts (S) from a reference scan to a target scan, which are calibrated to a change in temperature (T), or strain ($\varepsilon$).

A quality metric (Q) is also calculated to determine the degree of correlation between the reference and target scans. In conventional systems, the quality metric (Q) is employed as a reference to allow the user to determine whether or not there is sufficient correlation between the target scan and the reference scan for the calculation to be considered reliable.

Figure 1:
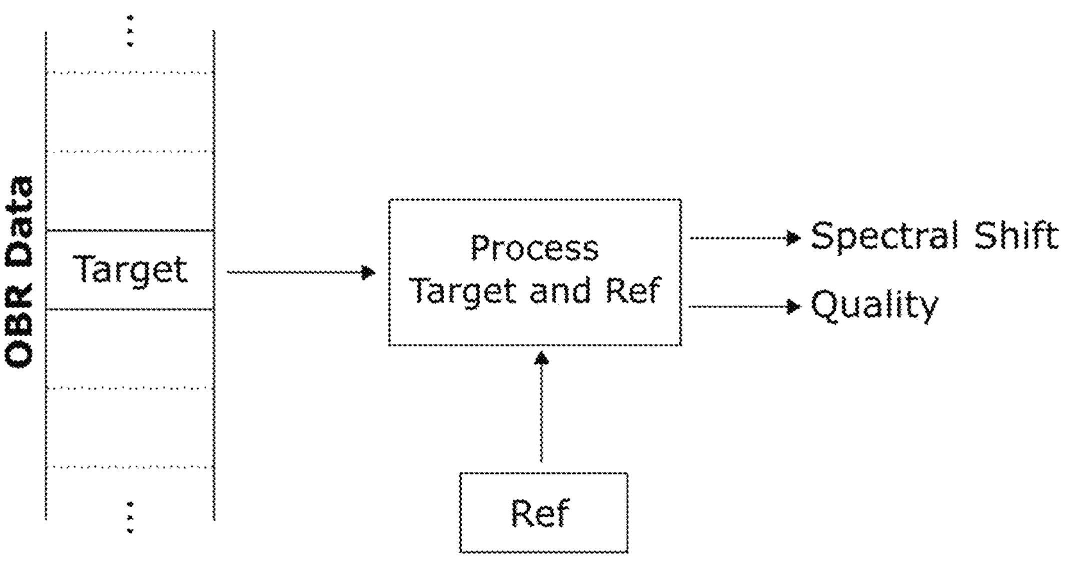
FIG. 1 is a schematic representation of a conventional static reference post-processing method.
Figure 2:
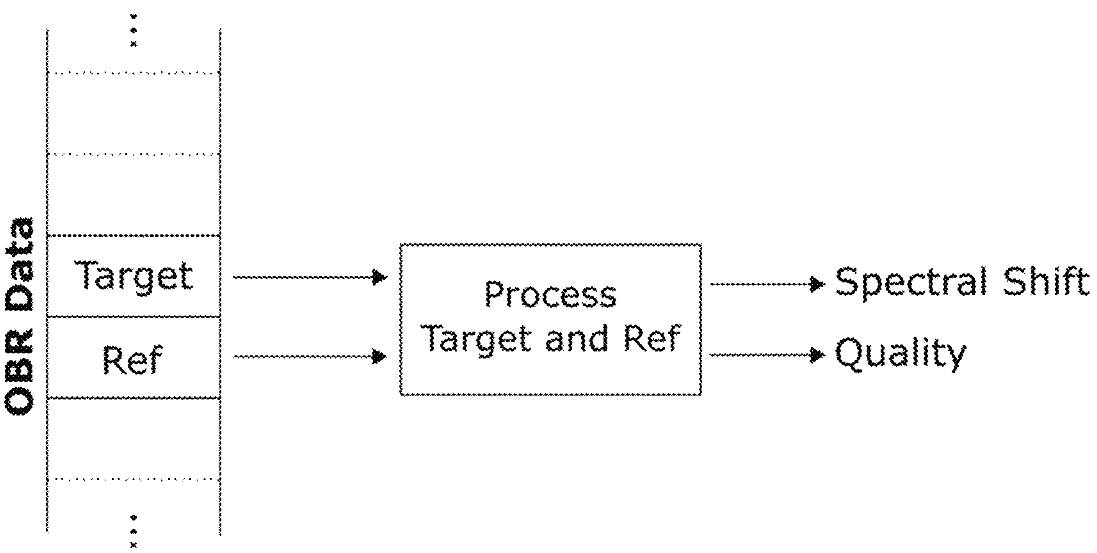
FIG. 2 is a schematic representation of a conventional running reference post-processing method.

One of two methods are currently used for post-processing of OBR data after it is recorded. FIG. 1 is a schematic representation of a conventional system implementing a pre-existing fixed reference to measure spectral shift. In this prior art post-processing method, a single fixed reference is used as a reference for all target scans. FIG. 2 is a schematic of an alternative conventional system using the preceding scan as the reference scan to calculate incremental changes in the spectral shift. In this prior art post-processing method, the reference scan is a single running reference that provides information on each target scan and the immediately preceding scan.

Figure 3:
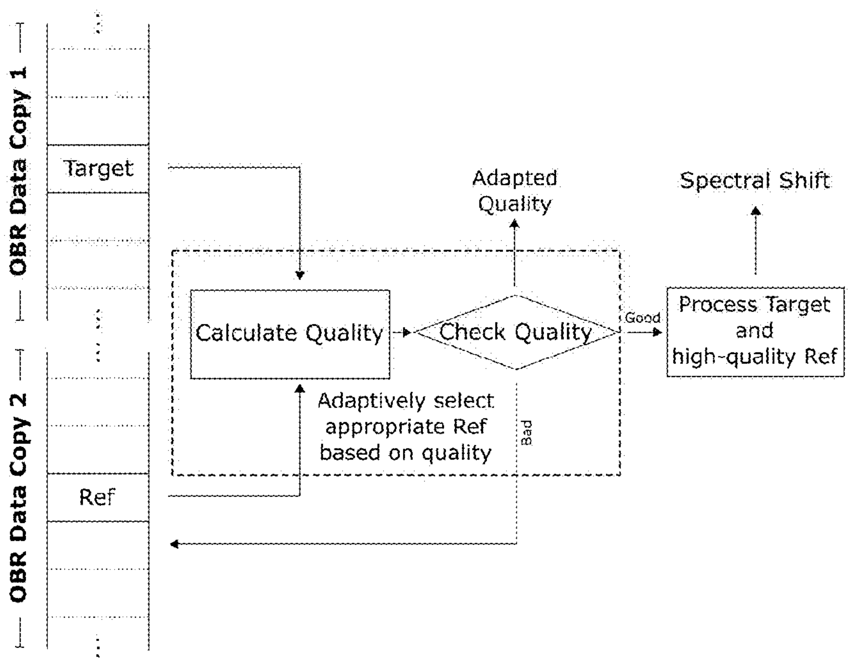
FIG. 3 is a schematic representation of an adaptive post processing method in accordance with an embodiment of the present invention.
Figure 4:
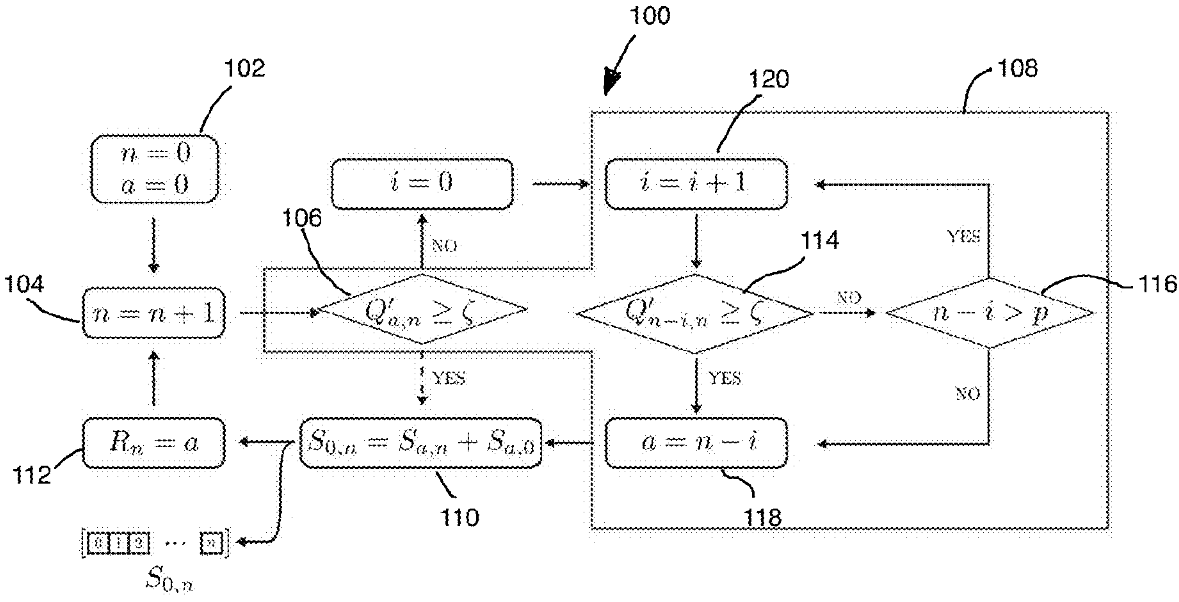
FIG. 4 is a detailed diagram illustrating the flow of an adaptive post processing method in accordance with an embodiment of the present invention.

The present invention provides an adaptive post-processing method that overcomes various shortcomings in the prior art. When implemented in the context of OBR, the adaptive post-processing method calculates the spectral shift and quality between a target and a reference OBR scan, like existing post-processing methods. However, in the adaptive method of the present invention, the reference is variable and the quality calculated between the two scans is used as a metric to select an appropriate reference (FIGS. 3 and 4). For example, FIG. 3 is a schematic representation of the adaptive method of one embodiment of the present invention. In this embodiment, the adaptive method includes calculating the quality between the target scan against a potential reference scan and, if the quality is sufficient (e.g. meets or exceeds a threshold), processing the target scan with that reference scan to determine spectral shift. However, if the quality between the target scan and the potential reference scan is not sufficient, the quality between the target scan and a new potential reference scan is calculated. The process of iterating through potential reference scans continues until a reference scan of sufficient quality is found.

The algorithm is configured such that the choice of reference for each target scan can be selected to improve correlation between a target scan and a reference scan that yields a rooted, high-quality measurement.

In one embodiment of the present invention, the reference scan is selected by iteratively assessing a quality metric of each prior scan as a reference scan for the current target scan, until a prior scan has been identified with a quality metric that is at or above a threshold value. In one embodiment, the system may iterate through the prior scans in chronological order, for example, starting with the first scan and cycling through each subsequent scan until a prior scan with the desired quality metric has been reached.

One implementation of this process will now be described with reference to FIG. 4. FIG. 4 is a flow diagram describing the flow of operations of one embodiment of the present invention 100.

1. At block 102, indices are created for the reference scan (a) and the target scan (n), both initialized to 0.
2. At block 104, the target scan index n is increased by 1.
3. At block 106, the geometric mean quality (Q') is calculated between the scans a and n. As used herein, Q represents the quality of the maximum of the cross-correlation of the reference and target scans normalized to the maximum of the autocorrelation of the reference scan, and Q' represents the maximum of the cross-correlation of the reference and target scans normalized to the geometric mean of the maximum of the auto-correlation of the reference scan and the maximum of the autocorrelation of the target scan.

4. If Q' is greater than or equal to a tolerance parameter (ζ), the reference a is deemed appropriate. If not, a loop 108 to find a better reference is started.
   a. If Q'≥ζ, the spectral shift ($S_{a,n}$) is calculated between a and n and then added to the spectral shift between a and the initial scan 0 ($S_{a,0}$) at block 110. The index a for scan n is stored in an array ($R_n$) at block 112. [Go to 4.b]
   b. If Q'<ζ, the reference for scan n is set to (n−1) and the quality $Q'_{n-i,n}$ is re-calculated with i=1. This process represented by loop 108 continues incrementing i at block 120 and re-calculating Q' until $Q'_{n-i,n}≥ζ$ at block 114 or the user-defined limit (p) on n−i is reached at block 116. In either case, a is set equal to n−i at block 118, $S_{a,n}$ is calculated, and then added to $S_{a,0}$ at block 110. [Go to 2]

It should be understood that the particular method for iterating through the prior scans may vary from application to application. For example, the system may cycle through the prior scans in chronological order, reverse chronological order or essentially any other sequence. The system may vary the starting point or the method for iterating through prior scans over time. For instance, the starting point for iteration may be the earliest scan, the scan immediately preceding the target scan or be based on what reference scan was selected for the immediately preceding target scan. In some applications, the algorithm may begin iterating with the immediately prior scan and continue in reverse chronological order. In some applications, the algorithm may begin iterating with the scan used as the reference scan for the previous target scan.

In this embodiment of the present invention, the quality metric used in evaluating each target scan/reference scan pair is the geometric mean quality (Q'). The present invention may, in some application, be implemented with alternative quality metrics, such as cumulative or compounded quality based on graph radius/path length between root scan (t=0) and target scan, or quality normalized to the inner product (autocorrelation) of the reference scan. It should be understood that the quality metric or quality value may vary from application to application depending on the nature of the measured characteristics.

Allowing the reference to be selected on the basis of quality provides a number of advantages. With regard to prior art fixed reference algorithms, changes in the fiber's material structure result in the inability to reliably calculate spectral shift between the scan of an affected fiber and the original reference. If this process is slow enough, the present invention with its adaptive reference can capture these slow changes and successfully resolve spectral shift. With regard to prior art running reference algorithms, poor-quality scans that are poorly correlated with their immediate neighbors do not affect subsequent measurements. The resolvable strain range is increased at the cost of increased error propagation, but only as needed to produce sufficient-quality spectral shift data.

Further, in this embodiment, the algorithm uses a sufficiency constraint (i.e. Q'≥ζ) rather than an optimal selection (i.e. max {Q'}), which eliminates a search through all possible cross-correlations within the data set. This embodiment therefore results in faster processing times compared to performing cross-correlations for all possible combinations of reference and target scans.

The quality of the scan may be defined as the minimum quality between individual segments in the target and reference scans in order to avoid comparisons between each segment of the sensor, which dramatically increases processing time. For example, in the context of a fiber optic sensor, the fiber optic may be subdivided along its length into individual segments, with each individual segment (or position) along the fiber optic being viewed as a separate sensor in that it can be separately processed to obtain what is essentially a distributed sensor reading associated with that position. Each measurement (with a unique timestamp) includes a set of spatial positions at which measurements are performed, each having an associated spectrum. For each spatial position, the shift (relative to the reference spectrum) and quality are calculated between timestamped measurements, forming a network of time-indexed nodes connected by edges weighted by quality using the corresponding spectrum from the same position at previous timestamps from the reference measurement. This process is repeated while varying the choice of reference measurement from the list of all previous measurements until a sufficiently high quality is identified between the target and reference measurements. This calculation of incremental shifts with acceptable quality allows for the calculation of the total shift from the first measurement to each other measurement by summing the incremental shifts. Performing this operation separately for all nodes optimizes the choice of reference for each node and each measurement to provide local shifts with the highest quality.

Figure 7:
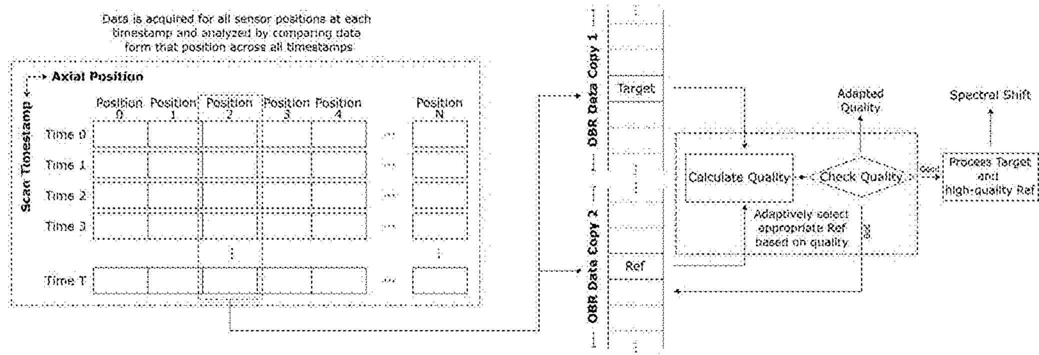
FIG. 7 is an enhanced schematic representation of an adaptive post processing method in accordance with an embodiment of the present invention.

Referring now to FIG. 7, each individual segment or region of the fiber optic is referred to as a position, such as Position 0, Position 1, etc. The number of positions, size of each position and location of each position may vary from application to application. In this embodiment, each measurement at each position contains a set of nodes, indexed by timestamp, and can be compared to the spectrum from the reference measurement at the same position across all timestamps. The shift and quality are calculated using the spectra from each timestamp for each position, to calculate incremental shifts from the timestamp of the first measurement, while identifying a sufficient quality pairing for each pair of target and reference measurements.

Figure 8:
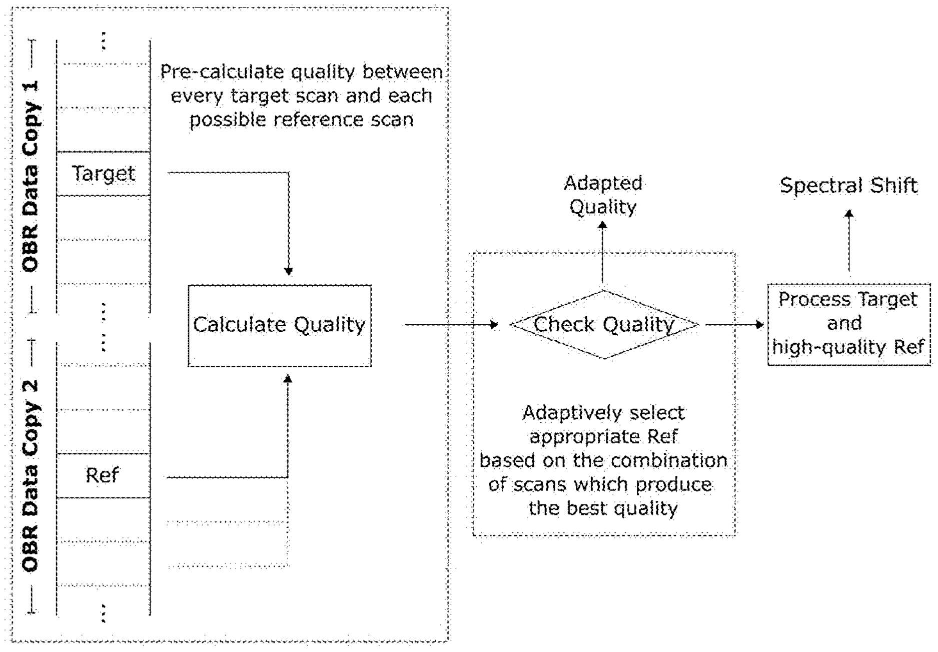
FIG. 8 is a schematic representation of an alternative adaptive post processing method in accordance with an alternative embodiment of the present invention.

In the embodiment discussed above, the present invention is implemented with a sufficiency constraint (i.e. Q'≥ζ) to control the search through the data set. This can greatly reduce the amount of processing required to arrive at a reference scan. However, in an alternative embodiment, the present invention may search through all possible cross-correlations within the data set and then select the reference scan that provides the highest quality. In this embodiment, the qualities of all possible Target-Reference pairs are calculated, prior to selection of the Target-Reference pairs which optimize the quality metric (FIG. 8).

As with the sufficiency constraint discussed above, this alternative approach can be implemented in a distributed sensor arrangement. For example, in the context of a fiber optic sensor, the fiber optic may be subdivided along its length into individual segments, with each individual segment (or position) along the fiber optic being viewed as a separate sensor capable of being separately processed. In this embodiment, the post processing method is generally the same as the sufficiency constraint embodiment discussed above, except for the way that the reference measurement is varied and the criterion for choosing the reference measurement. Instead of varying the reference measurement until the quality exceeds a prescribed threshold, the reference measurement is sequentially set to all preceding measurements to calculate the quality for all measurements relative to all preceding measurements. For each measurement, the selected reference measurement is chosen to be that which maximizes the quality between nodes in the reconstruction. This process is repeated for all nodes and all measurements. In this embodiment, the algorithm operates to maximize to the quality of the lowest quality node pair. Alternative embodiments could include alternative methods for optimizing the quality, such as cumulative sum or cumulative product.

Figure 9:
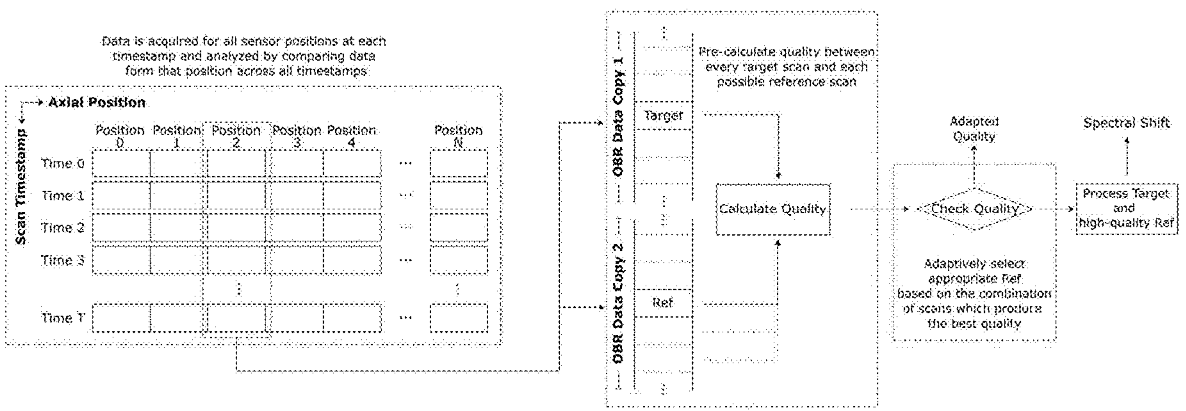
FIG. 9 is an enhanced schematic representation of the alternative adaptive post processing method of FIG. 8 showing the post processing of a single sensor position.

More specifically, in this alternative embodiment, each measurement at each position contains a set of nodes, indexed by timestamp, and can be compared to the spectrum from the reference measurement at the same position across all timestamps (See FIG. 9). The shift and quality are calculated using the spectra from each timestamp for each position, to calculate incremental shifts from the timestamp of the first measurement, while maximizing the quality of the lowest quality pair for each pair of target and reference measurement.

This alternative embodiment provides much the same benefits as the sufficiency embodiment discussed above. With regarding to prior art fixed reference systems, changes in the fiber's material structure result in the inability to reliably calculate spectral shift between the scan of an affected fiber and the original (fixed) reference. If this process is slow enough, the adaptive reference process of the present invention can capture these slow changes and successfully resolve spectral shift. With regard to prior art running reference systems, poor-quality scans that are poorly correlated with their immediate neighbors do not affect the measurements of subsequent measurements.

Figure 10:
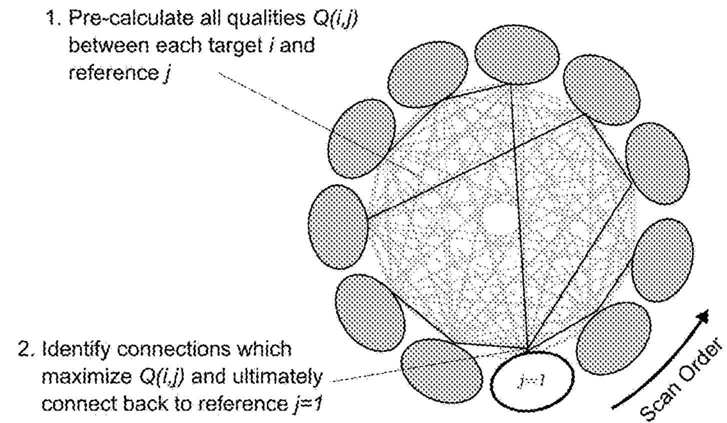
FIG. 10 is a graphical representation of the alternative adaptive post processing method of FIG. 8.

Using an optimality constraint (i.e. selecting the Target-Reference pairs which maximize Q' enables the best possible measurement reconstruction based on the Q' metric (See FIG. 10). This approach produces the best-quality spectral shift reconstruction possible given for a specific dataset using the Q' metric. All possible quality metrics between Target-Reference pairs are first calculated then spectral shift measurements are reconstructed based on the differences between each scan, always rooted to the first scan.

B. Adaptive Post Processing

To balance the trade-off between spectral shift range and error propagation, the present invention proposes a hybrid method, inspired by the movement of an inchworm with the goal of resolving as much of the spectral shift data as possible while mitigating unnecessary propagation of error. This algorithm changes the reference scan if and only if doing so would produce spectral shift measurements of a sufficiently high quality. The use of a quality metric to inform the change in reference scan also differentiates this approach from previous approaches. The applicability of the inchworm algorithm is demonstrated using three OFDR data sets derived from (1) a sensor suspended within a furnace heated in steps up to 950° C., (2) a sensor embedded in aluminum and heated to 500° C., and (3) a fiber suspended in the core of a nuclear research reactor and exposed to a total neutron flux of $2\times10^{13}$ n/cm$^2$/s over five days, resulting in a total neutron fluence of $2.5\times10^{18}$ n/cm$^2$. These case studies demonstrate the improved accuracy of the inchworm algorithm over the running reference and static reference methods, and they also result in generally higher quality spectral shift measurements. These improvements are demonstrated especially well for optical fiber sensors deployed in environments that slowly affect their microstructures through processes such as high-temperature annealing and neutron irradiation. Furthermore, the inchworm method was developed to be a drop-in replacement for post-processing OFDR data acquired using Luna Innovation's OBR 4600 system, but they can be readily implemented for use with other similar systems to improve their functional measurement range through sophisticated post processing.

Figure 5:
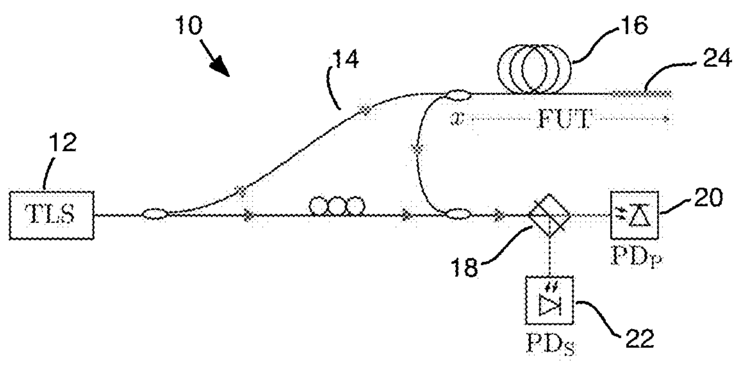
FIG. 5 is a schematic representation of an OBR system suitable for use in collecting measurements to be adaptively post processed in accordance with an embodiment of the present invention.

FIG. 5 is a schematic representation of an OFDR optical network 10. In this embodiment, a tunable laser source ("TLS") 12 launches light into a Mach-Zender interferometer 14 coupled to a fiber under test ("FUT") 16. Reflections from the FUT 16 re-enter the interferometer 14 and interfere with light from the TLS 12. The interfering light is split by a polarizing beam splitter 18 into S- and P-polarization states before being independently recorded using photodetectors $PD_s$ 20 and $PD_p$ 22. The FUT includes a termination 24 (typically ~10 cm), which prevents strong back reflections at the end of the fiber. Alternative methods include using index matching gel, polishing the end of the fiber at an angle or crushing the end of the fiber.

As can be seen, the OFDR optical network of FIG. 5 uses a TLS to interrogate the optical FUT using a Mach-Zender interferometer (FIG. 5). The TLS is swept through its frequency range ($\Delta v$) according to a function $\lambda(t)$ as the wavelength-dependent optical intensity I(t) is monitored. With a sweep rate of $\lambda(t)$ starting at wavelength $\lambda_0$ (or frequency $v_0$), $$v(t) = \frac{c}{\lambda(t) + \lambda_0},$$

where v(t) is the optical frequency and C is the speed of light in a vacuum. By recording t, v(t), and I(t), intensity measurements as a function of frequency I(v) can be calculated. In practice, the interfering light leaving the interferometer is split into S_ and P_ polarization states and recorded by two separate detectors. Though polarization dependence is not considered herein, the methodology described below would still apply after taking a vector sum of the two polarization states.

A Fourier transform $\mathcal{F}\{\cdot\}$ is performed on I(v) to give $$\bar{I}(\tau) = \mathcal{F}\{I(v)\},$$

where $\bar{I}$(T) denotes the intensity of the interference pattern as a function of the difference in time-of-flight $\tau$ between light reflected from various locations along the FUT and the light transmitted directly through the reference arm of the interferometer. Light passes through the FUT with group index $n_g$ and is reflected at positions x (relative to the start of the FUT) before returning back down the same path and ultimately reaching the photodetectors. $\bar{I}$(x) can be calculated from $$\bar{I}(\tau) = \int_{v_0-\Delta v/2}^{v_0+\Delta v/2} I(v)\exp(-j\tau v)dv.$$

The inter-conversion $\bar{I}(T)\leftrightarrow\bar{I}(x_z+x)$ can then be performed as $\tau=2n_g(x_z+x)/c$, where $x_z$ is the internal path length difference between the two arms of the interferometer (i.e., without an FUT). Random density fluctuations along the length of an optical fiber result in a small fraction of the incident light being reflected at interfaces with differing densities and refractive indices. These variations in density and refractive index manifest as small variations in the electrical permittivity along the length of the fiber, $$\bar{I}(x_z+x)=K\Delta\bar{\varepsilon}^*(x_z+x),$$

where K is a proportionality constant primarily related to the wavelength of the TLS, and inversely proportional to the refractive index, and $\bar{\varepsilon}^*(x_z+x)$ is the complex conjugate of the electrical permittivity of the FUT at positions x.

Figure 6A:
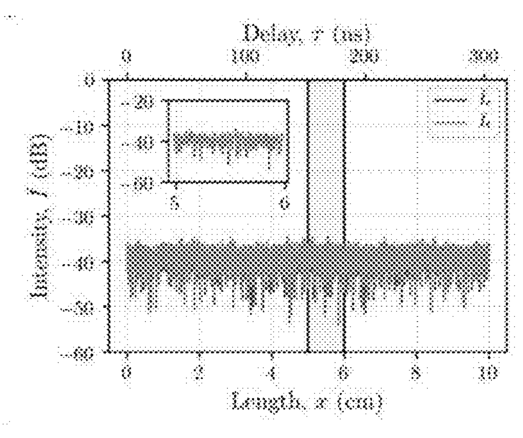
FIGS. 6A-D are graphs representing an exemplary implementation of the present invention.
Figure 6B:
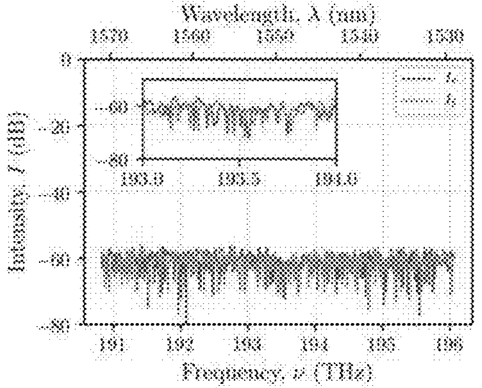
Figure 6C:
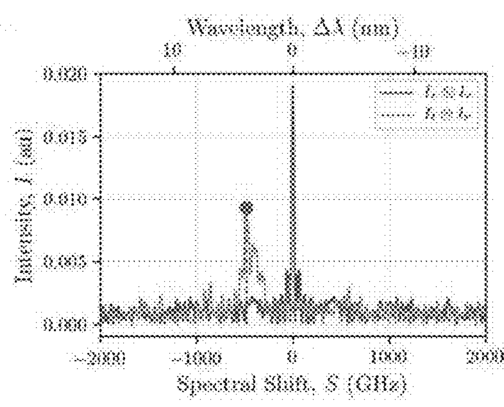
Figure 6D:
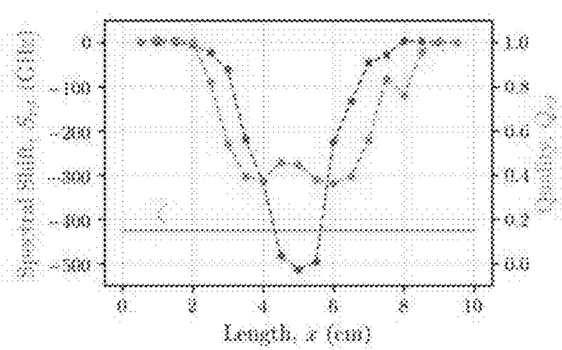

The random, static spatial variations in electrical permittivity are unique to each fiber. Changing the temperature or strain state of the fiber is manifested as a v-domain phase shift in the complex electrical permittivity. Therefore, the electrical permittivity can be used as a reference for determining the change in temperature or strain between a target and reference scan. Because $\bar{I}(x_z+x)$ gives information regarding the spatially dependent permittivity, $\bar{I}(x_z+x)$ can be discretized into individual "sensors" with index m centered at position $x_m$ with a gauge length of $\Delta x$ (FIG. 6A). Windowing this data and performing an inverse Fourier transform gives the spectrum (in the V domain) of locally reflected light for $x\in[x_m-\Delta x/2, x_m+\Delta x/2]$. The inverse Fourier transform is performed on both the reference and target scans so that the spectra can be directly compared (FIG. 6B). Because the Rayleigh backscatter is a weak, random signal, the spectral shift caused by local strain in the fiber is not easily identifiable visually. Instead, a complex cross-correlation is used to quantify the spectral shift between a target scan $I_t(v)$ and a reference scan $I_r(v)$ in the v-domain (FIG. 6C). The window in the $\tau$ or x domain is then moved according to the user-defined sensor spacing, and the inverse Fourier transform cross-correlation process is repeated for each sensor along the length of the fiber (FIG. 6D).

In practice, the inverse Fourier transform and cross-correlation can be performed simultaneously by taking advantage of the convolution theorem:

$$(I_t\otimes I_r)(v)=\mathcal{F}^{-1}\{\bar{I}_t(x)\cdot\bar{I}_r^*\cdot(x)\},$$

where $$\vec{I}_t(x)$$

is the complex conjugate of the target scan, and $$\bar{I}_r^i(x)$$

is the time-reversed reference scan. Note that this operation is only performed on $$\bar{I}_x^*(x)\text{ and }\bar{I}_r^i(x),$$

which are both in the x domain. The argmax [ ] function is then used to identify the spectral shift $S_{r,t}$ for the specific combination of reference (subscript r) and target (subscript t) scans, $$S_{r,t}=\text{argmax}[(I_t\otimes I_r)(v)].$$

The cross-correlation operation determines the amount that the reference spectrum must be shifted in frequency to overlap with the target spectrum. The quality is a metric for quantifying the degree of overlap between the shifted reference spectrum and the target spectrum, relative to a target spectrum with perfect overlap, as defined by the autocorrelation of the reference spectrum: (Equation A)

$$Q_{r,t}=\frac{\max[(I_t\otimes I_r)(v)]}{\max[(I_r\otimes I_r)(v)]}. \quad \text{(Equation A)}$$

To understand how a local change in temperature or strain causes a shift in the V domain, each of the random spatial variations in permittivity is often modeled as a weakly reflecting Bragg grating with a random variation in amplitude and phase, along the grating length. Let $\lambda_{FBG}$ and $v_{FBG}$ denote the Bragg wavelength and frequency, respectively, of an unstrained grating with an effective group index $n_g$ and an average grating period $\lambda$. A homogeneous and isotropic strain $\in$ causes a fractional change in the Bragg wavelength $\delta\lambda_{FBG}$ and a corresponding spectral shift $S_{r,t}=\delta v_{FBG}$ equal to $$\frac{\delta\lambda_{FBG}}{\lambda_{FBG}}=-\frac{\delta v_{FBG}}{v_{FBG}}=(1-p_e)\varepsilon=K_\epsilon\epsilon,$$

where $p_e$ is a constant that includes photoelastic contributions and is a function of $n_g$ and the fiber's Pockel's coefficients. A change in temperature ($\Delta T$) also causes a shift in $\delta\lambda_{FBG}/\lambda_{FBG}$ that depends on the thermal expansion coefficient $\alpha$ and a change in $n_g$:

$$\frac{\delta\lambda_{FBG}}{\lambda_{FBG}}=-\frac{\delta v_{FBG}}{v_{FBG}}=\left(\alpha+\frac{1}{n_g}\frac{dn_g}{dT}\right)\Delta T=K_T\Delta T. \quad \text{(Equation B)}$$

Therefore, the spectral shift is a linear combination of the thermal and mechanical contributions:

$$S_{r,t}=V_{FBG}(K_\epsilon\epsilon+K_T\Delta T),$$

where $K_\in\approx0.78$ and $K_T\approx6.7\times10^{-6}$° C.$^{-1}$. For most applications, the nominal wavelength and frequency of the TLS are used for $\lambda_{FBG}$ and $v_{FBG}$, respectively.

A. Static Reference vs. Running Reference

Let $\bar{I}(x)=\bar{I}_1(x_m), \bar{I}_2(x_m), \ldots, \bar{I}n(x_m)$ be defined as an ordered set of OFDR scans such that index $n\in[1, N]$ is associated with a time-stamped OFDR scan divided in the x-domain into M individual sensors with spatial index m. Each sensor is centered at $x_m$ with gauge length $\Delta x$. If the gauge length of each sensor is equal to the sensor spacing, then there is no overlap between the gauge length of adjacent sensors (m−1 and m+1), and each sensor spans $x \in [x_m - \Delta x/2, x_m + \Delta x/2]$. Overlapping of adjacent sensors is allowable, but it is not considered in the remainder of this section.

The conventional approach to resolving spectral shift in an optical fiber over a series of OFDR scans is to select and fix an additional, initial scan (n=0) as the reference ($\bar{I}_r(x_m) = \bar{I}_0(x_m)$) and obtain a spectral shift for all sensors relative to the reference measurement:

$$S_{0,n}(x) \forall\ n \in [1, N].$$

$Q_{0,n}(x)$ is calculated in a similar way using $\bar{I}_0(x_m)$ and $\bar{I}_n(x_m)$ over the M FUT segments. Luna Innovations Inc., one manufacturer of OFDR-based measurement systems, generally recommends that $Q_{0,n}(x) \geq \zeta = 0.15$ to consider the scan reliable, based on empirical evidence. With this conventional approach, the quality is only used as a binary indicator of whether or not a particular measurement is reliable. The static reference method inherently assumes that the amplitudes of $\bar{I}_t(x)$ and $\bar{I}_r(x)$ within the region of interest do not vary significantly over time, so a single $\zeta$ value can be used for all scans to determine whether the quality is acceptable. The range of strain that can be resolved is limited to the ratio of $\Delta v$ to the nominal TLS frequency. Furthermore, for some applications in which the fiber experiences significant changes in $\bar{\varepsilon}(x)$ (i.e., changes in the Rayleigh backscatter profile), the static reference approach simply cannot reliably determine a spectral shift because the distribution of scattering centers within the fiber fundamentally changes.

To resolve spectral shifts beyond the range of a static reference measurement, a running reference approach has recently been proposed and used to successfully resolve large strains in optical fibers that were embedded in a hardening epoxy. Many embedding processes result in significant strain resulting from differential thermal expansion or other expansions/contractions of the surrounding matrix material (e.g., during setting). To resolve larger spectral shifts, the running reference method calculates the spectral shifts $S_{k-1,k}$ between consecutive scans, and then it takes the cumulative sum of $S_{k-1,k}$ for all scan indices $k \in [1, n]$ to calculate $S_{0,n}$:

$$S_{0,n}(x) = \sum_{k=1}^{n} S_{k-1,k}(x) \forall\ n \in [1, N].$$

$Q_{n-1,n}(x)$ is calculated using $\bar{I}_{n-1}(x)$ and $\bar{I}_n(x)$.

C. Inchworm Algorithm

Maintaining a static reference throughout an experiment results in a smaller propagation of error at the cost of limited strain range, because each measurement only depends on itself and a single reference scan. The static reference method also cannot resolve spectral shifts if the Rayleigh backscatter profile is significantly changed. Alternatively, a running reference approach can be used to resolve large strains, as well as significant changes to the Rayleigh backscatter profile, at the expense of increased error propagation (proportional to the square root of the number of scans). The error increases for the running reference method because the reference for each scan is always set to that of the previous scan. Because the running reference method requires a cumulative sum of incremental spectral shifts, it also cannot provide reliable spectral shift data after a low-quality measurement is recorded. The algorithm described herein accepts a larger measurement error in exchange for increased measurement range and the ability to resolve gradual changes in the Rayleigh backscatter profile, but only when required. This is accomplished using a more sophisticated hybrid reference scheme, inspired by the movement of an inchworm, that uses a measurement of scan quality to facilitate this trade-off.

The "inchworm" algorithm begins in a manner similar to the static reference method by calculating $S_{0,1}(x)$. However, in anticipation of a slow change in $\bar{\varepsilon}(x)$ that could significantly alter the Rayleigh backscatter profile and prevent the cross-correlation function from determining a reliable spectral shift, a modified quality $Q'(x)$ is defined as the geometric mean of $Q_{r,t}(x)$ and $Q_{t,r}(x)$:

$$Q'_{r,t}(x) = \sqrt{Q_{r,t}(x) \cdot Q_{t,r}(x)}.$$

This modified quality is necessary because of the way the quality is normalized using an autocorrelation function, as shown in Equation A (above). If the Rayleigh backscatter profile is significantly altered, it is possible that the measured intensity of the target scan could also change significantly, compared to that of the reference scan. This change in intensity must be considered when using a constant quality threshold when comparing the degree of correlation between scans with significantly different intensities. For example, if the amplitude of $I_t$ is smaller than the amplitude of $I_r$, then $\max\{I_r \otimes I_r\} > \max\{I_t \otimes I_t\}$, which may artificially decrease $Q_{r,t}$ due to changes in the reflected intensity that are unrelated to the degree of correlation between the reference and target scan. Using $Q'_{r,t}$ is identical to $Q_{r,t}$ if $I_r$ and $I_t$ are similar in amplitude but provides a more appropriate normalization between measurements with significantly different intensities. The more uniform normalization provided by the geometric quality $Q_{r,t}$ allows for the use of a single acceptance criterion $\zeta$ to determine whether or not a particular combination of reference and target scans provides a reliable spectral shift, even with significant differences in the intensity of the reflected light.

The second step proceeds in a manner similar to the first: by evaluating $S_{0,2}(x)$ and $Q'_{0,2}(x)$. However, if $\min(Q'_{0,2}(x)) < \zeta$, then the spectral shift and quality are re-evaluated as $S_{1,2}(x)$ and $Q'_{1,2}(x)$, which resembles the running reference method and extends the measurement range if required, albeit at the expense of propagating additional error. If $\min(Q'_{1,2}(x) \geq \zeta$, then the running reference measurement is accepted. The reference scan's index is stored in an array $R_n$ for each target scan n so that the cumulative spectral shift can be determined for each target scan. This is accomplished by summing the incremental spectral shifts from preceding scans, which could use varying reference scans in an approach similar to that used in the running reference method. For cases in which $\min(Q'_{1,2}(x)) < \zeta$, $S_{0,2}(x)$ and $Q'_{0,2}(x)$ are accepted (i.e., the algorithm defaults to the static reference), but $R_2$ is set equal to −1 to denote that the $n^{th}$ scan should not be used as a reference for future measurements because it could not be paired with a reference scan that produced an acceptable quality.

A more general summary of the inchworm algorithm is described in FIG. 4. FIG. 4 is a flow diagram of the inchworm OFDR reconstruction algorithm in accordance with one embodiment of the present invention. The quality $Q'_{a,n}$ of reference scan α compared with target scan n is calculated until it is above a threshold ζ, or the list of prior scans is exhausted. Upon identifying scans α and n for which $Q'_{a,n}>\zeta$, the spectral shift San is calculated and added to $S_{0,a}$ before repeating the process for the next scan n+1.

More specifically, as the target scan index n is increased, the reference to which all future spectral shifts are calculated (α) is allowed to vary, though α is initially set to 0. For scan n, the algorithm first calculates $S_{a,n}(x)$ and $Q'_{a,n}(x)$, If min $(Q'_{a,n}(x)=\zeta$, $S_{a,n}(x)$ and $Q'_{a,n}(x)$ are accepted, then $R_n$ remains equal to 0, and n is incremented. If not, the parameter i∈[0, n−1] is introduced and initialized to 0. Then, i is incremented until $\min(Q'_{n-i,n}(x)\geq\zeta$ (acceptable combination of target and reference scans) or n−i≤p, where p∈[0, n−1] is a user-defined limit that determines how far back the algorithm will search for an acceptable pairing of target and reference scans. Once min $(Q'_{n-i,n}(x)\geq\zeta$ or n−i≤p, $S_{a,n}(x)$ and $Q'_{a,n}(x)$ are accepted, $R_n$ is set equal to α=n−i, and n is incremented. $S_{0,n}$ is calculated from $S_{a,n}$ by adding $S_{0,a}$. If P=0, then the inchworm algorithm defaults to a static reference (α=0) when no acceptable pairing of target and reference scans can be found. At the other extreme, if p=n−1, then the inchworm algorithm defaults to the running reference method if min $(Q'_{a,n}(x)<\zeta$. In general, decreasing the value of p increases the chances of identifying an acceptable pairing of target and reference scans at the expense of increased processing time. All data described herein were processed with p=0 and ζ=0.15 to be consistent with the manufacturer's suggestion.

D. Reconstruction of High-temperature Data

A change in temperature will introduce a spectral shift as a result of thermal expansion and temperature-dependent refractive index changes along the fiber, as shown in Equation B (above). However, previous work has shown that post-processing of OFDR measurements made at temperatures in the range of 600-800° C. using a static reference fails to yield a reliable measurement of spectral shift. The previous work speculates that the sensing failure was caused by increased oxygen diffusion at higher temperatures, which could fundamentally change the distribution of defects that establish the Rayleigh backscatter profile. This would result in a reduced quality when comparing the high-temperature scans with a static reference.

Figure 11A:
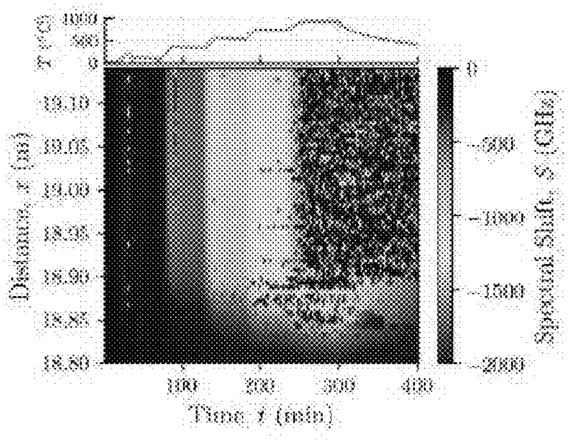
FIG. 11A-D is a set of graphs that allow comparison of the spectral shifts and quality measurements performed on high temperature data using the static reference method against those of an embodiment of the present invention.
Figure 11B:
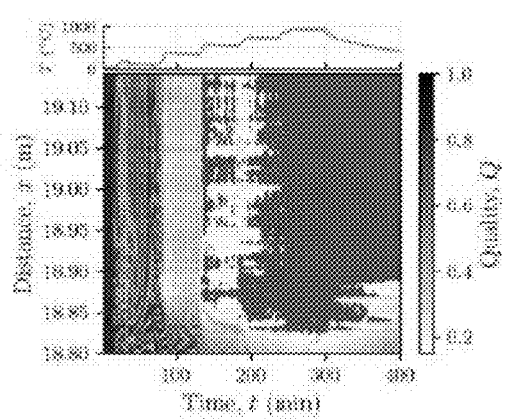
Figure 11C:
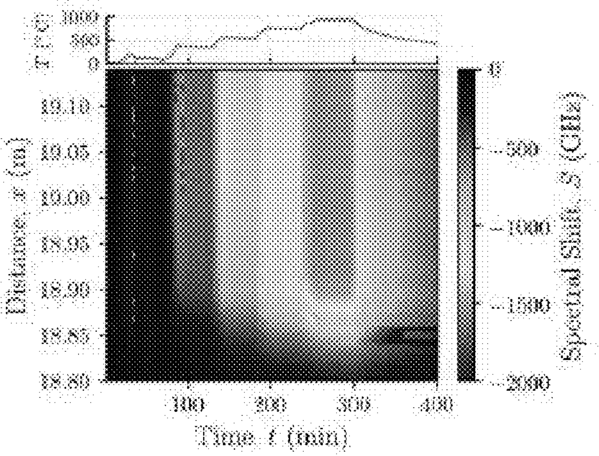

The inchworm algorithm is expected to improve the quality of the spectral shift measurements by allowing the reference to vary over the course of the experiment so that the slow changes in the distribution of scattering centers can be captured. To demonstrate this, both the static reference and inchworm methods were used to process data from OFDR scans that were obtained from an optical fiber heated in a box furnace (FIGS. 11A-D). FIGS. 11A-D show data collected from a freely suspended optical fiber in a furnace heated in steps from 22 to 950° C. FIGS. 11A and B show spectral shift measurements and quality measurements performed using the static reference method. FIGS. 11C and D show spectral shifts and quality measurements performed using the inchworm algorithm. The red regions in FIGS. 11B and 11D indicate the points at which Q<0.15 and Q'<0.15. Thermocouple measurements are plotted over time above each spectral shift and quality colormap. The optical fiber was freely suspended in air within the furnace as the temperature was increased in steps to 100, 350, 550, 750, and 950° C., holding at each temperature for ~40 minutes. Consistent with the results of Wood et al., the static reference started to produce erroneous measurements when the nominal temperature was increased to 750° C., as evidenced by the increased noise in the spectral shift data (FIG. 11A) and the reduced quality (FIG. 11B). The static reference failed to produce any reliable data once the fiber was heated to 950° C. Furthermore, these changes were irreversible, as evidenced by the noisy spectral shift data and low quality as the optical fiber was cooled following operation at 950° C.

Figure 11D:
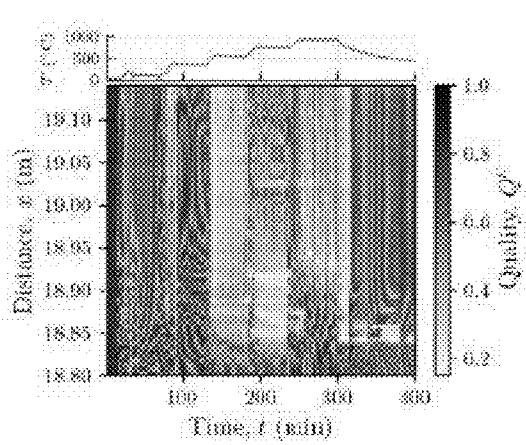

The same data set was analyzed using the inchworm algorithm, which enabled data within the heated region to be resolved over the entire experiment (FIG. 11C). This is because the inchworm algorithm allowed for an intermediate reference to be used to bridge the spectral shift measurements during each temperature step. These shifts in reference are identifiable as blocks in the quality measurements (FIG. 11D). The spectral shift measurements made using the inchworm algorithm are also generally of higher quality within the heated region compared to those using the static reference method. It is also worth noting that one scan ~30 min into the experiment produced an unacceptable quality and erroneous spectral shift data. If this data were processed using the running reference approach, then the errors introduced during this scan would propagate through the remainder of the experiment. The inchworm method provides the flexibility to recover from one poor quality scan by using an earlier reference. Ultimately, the inchworm algorithm is able to recover spectral shift data obfuscated by previous analysis techniques. The temperature profile of the furnace is recovered, and the spectral shift data agrees with the thermocouple readings recorded during the experiment.

E. Reconstruction of High Strain Data

The inchworm algorithm was also used to evaluate data taken from a constrained fiber during heating to evaluate strain that was introduced due to differential thermal expansion (FIGS. 12A-D). FIGS. 12A-D show data obtained from an optical fiber embedded in aluminum and heated in steps up to 500° C. FIGS. 12A and B show spectral shifts and quality measurements performed using the static reference method. FIGS. 12C and D show spectral shifts and quality measurements performed using the inchworm algorithm. The red regions in FIGS. 12B and 12D indicate the points at which Q<0.15 and Q'<0.15. The dashed white lines indicate the boundaries of the embedded region. Thermocouple measurements are plotted over time above each spectral shift and quality colormap.

More specifically, a copper-coated optical fiber was embedded in aluminum using an ultrasonic additive manufacturing process and heated in steps up to 500° C. while recording the temperature and OFDR spectra in situ. Similar tests were performed on copper-coated optical fibers embedded in nickel layers on top of a stainless steel substrate. The embedded region of the fiber from 16.08 to 16.15 m is identified by dashed white lines in FIG. 12A-D. The greater spectral shift in the embedded region is the result of differential thermal expansion caused by the mismatch in the coefficient of thermal expansion (CTE) between the aluminum matrix and the silica fiber. Outside the embedded region, there is still an increase in the magnitude of the spectral shift due to temperature effects, which is similar to the results shown previously for the freely suspended fiber.

Using a static reference, the magnitude of the spectral shift increases to a maximum value of approximately 2,000

GHz within the center of the embedded region (~16.12 m). However, at 300 min, when the temperature was ~400° C., only a small portion of the embedded region produced reliable spectral shift measurements, as evidenced by the noisy spectral shift data (FIG. 12A) and the low quality (FIG. 12B). However, using the inchworm algorithm, spectral shift measurements throughout the embedded fiber can be obtained for up to 300 min, at which point the noise in the spectral shift data appears (FIG. 12C). The quality of the spectral shift data is also higher for the inchworm method (FIG. 12D) compared with the static reference method (FIG. 12B). Furthermore, the inchworm algorithm also calculates an unacceptable quality over essentially the entire embedded region after heating to the maximum temperature of 500° C. This suggests that the inchworm algorithm may be more reliable at indicating low-quality data. Future work will investigate why the inchworm algorithm was not able to resolve the high strain data beyond 300 min and whether this unresolvable data is a product of the algorithm or a more fundamental change in the fiber itself.

F. Reconstruction of Neutron Irradiation Data

Extension of OFDR-based fiber optic temperature or strain sensors to nuclear applications requires that the sensors survive exposure to significant displacement damage from fast neutrons during irradiation. Wilson et al. performed OFDR measurements of Rayleigh backscatter in silica fibers during neutron irradiation and calculated the spectral shift using the static reference method. They concluded that the static reference method fails to produce a reliable spectral shift after accumulating a total neutron fluence of $8\times10^{17}$ n/cm$^2$. It is postulated that the failure mechanism under neutron irradiation is a result of displacement damage, which alters the distribution of scattering centers within the fiber. This is similar to what occurs during thermal annealing. Because the inchworm algorithm could be used to resolve spectral shift data at higher temperatures than the static reference method, it is possible that the algorithm could also resolve spectral shift data at a higher neutron fluence.

Figure 13A:
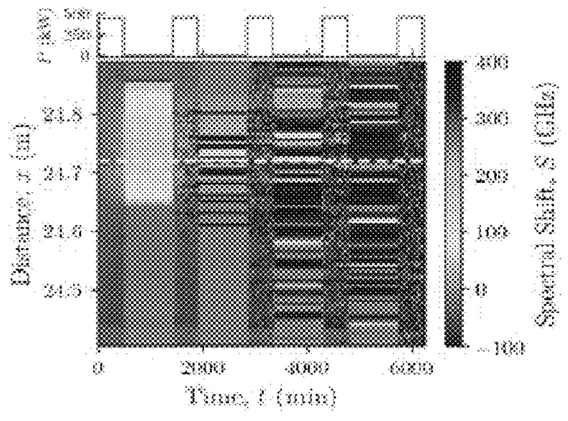
FIG. 13A-D is a set of graphs that allow comparison of the spectral shifts and quality measurements performed on neutron irradiation data using the static reference method against those of an embodiment of the present invention.
Figure 13B:
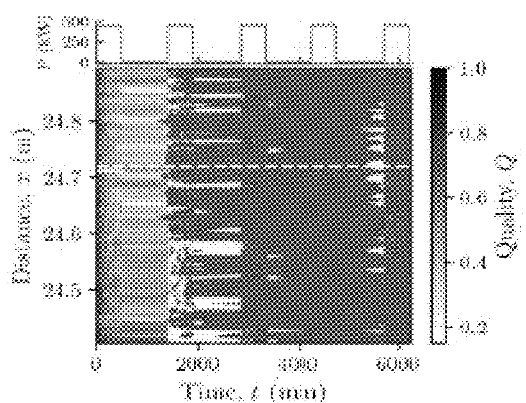
Figure 13C:
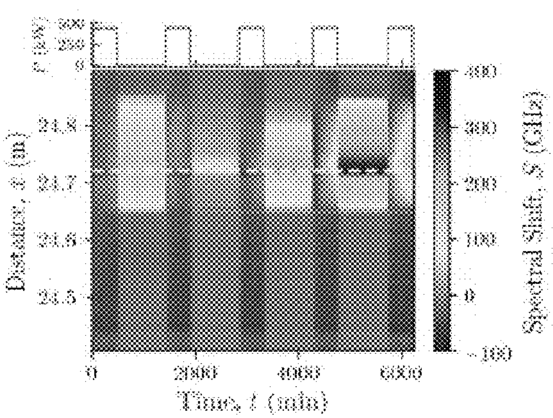
Figure 13D:
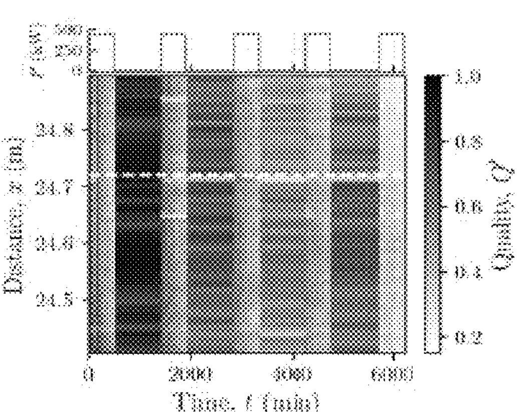

To test this hypothesis, the inchworm algorithm was used to process OFDR data from an experiment in which Corning SMF-28 singlemode fiber was irradiated in the central irradiation facility of the Ohio State University Research Reactor (OSURR) (FIG. 13A-D). FIGS. 13A-D show data measurements from an optical fiber under neutron irradiation at the OSURR with a total neutron flux of $2.9\times10^{13}$ n/cm$^2$/s. FIGS. 13A and B show spectral shifts and quality measurements performed using the static reference method. FIGS. 13C and 13D show spectral shifts and quality measurements performed using the inchworm algorithm. The red regions in FIGS. 13B and 13D indicate the points at which $Q<0.15$ and $Q'<0.15$. The dashed white line indicates the midplane of the reactor core, which extends from 24.42 m (top of the core) to 25.02 m (bottom of the core). OSURR power measurements are plotted over time above each spectral shift and quality colormap.

The test was originally designed to evaluate the performance of FBGs inscribed in short sections of sapphire optical fiber that were spliced to the end of the SMF-28 fiber. However, OFDR allows for evaluation of the SMF-28 section, which is relevant to this work. The fiber was exposed to a peak fast neutron flux of $5.8\times10^{12}$ n/cm$^2$/s ($2.9\times10^{13}$ n/cm$^2$/s total flux) at 450 kW over five, eight-hour days of irradiation for a total neutron fluence of $2.5\times10^{18}$ n/cm$^2$. The vertical mid-plane of the core was located at 24.72 m along the fiber, with the active core region extending from 24.42 m (top of the core) to 25.02 m (bottom of the core). A co-located thermocouple within the experiment measured a maximum temperature of 80° C. at the core's mid-plane while the reactor was operating.

Using a static reference, the spectral shift calculated from the irradiated fiber was accurately resolved for the first 24 hours (1,440 min) before the algorithm produced noisy spectral shift measurements (FIG. 13A) with unacceptable quality (FIG. 13B). However, post-processing using the inchworm algorithm yields results without the noisy data produced after 24 hours using the static reference method (FIG. 13C). The inchworm produces reliable spectral shift measurements over all 5 days of irradiation, with significantly higher quality compared to the static reference method. The increased reliability of the data processed using the inchworm algorithm is a result of varying the reference scan over time, which significantly increases the quality (FIG. 13D). During reactor operation, the spectral shift generally becomes slightly negative, at least during the first few days of operation, due to increased temperatures during operation. However, after the end of each day of irradiation, when the reactor is shut down and the temperature returns to its nominal temperature, the spectral shift increases to greater than zero, particularly for locations close to the core mid-plane. This effect is a result of radiation-induced compaction of the fused silica. The compaction occurs during irradiation, but the effect becomes much more evident once the compacted fiber cools. With one exception, after the second day of irradiation, the compaction generally increases with increasing irradiation time or increasing neutron fluence.

G. Discussion

Post-processing algorithms for OFDR scans involve comparison of the Rayleigh backscatter profile from a target scan to that of a reference scan to calculate the spectral shift between the two. The choice of reference scan influences the resolvable spectral shift range, as well as the quality of the measurements. The static reference approach typically uses the first scan in a set as a reference so that all other scans are compared to a single scan. Using a static reference has the main benefit of ensuring that each scan has the same minimal measurement error that does not compound between consecutive measurements. Processing times are also minimized because only one set of spectral shift measurements is calculated for each of the $N-1$ target scans. While a static reference can be effectively used to resolve small temperature changes and small strains, the major drawback to using a static reference is that it is unable to resolve large spectral shifts or gradual changes in the distribution of scattering centers that define the Rayleigh backscatter signature. The running reference method determines incremental changes in spectral shift by comparing each scan to the previous scan. At the cost of increased error propagation, a running reference algorithm can resolve a larger range of spectral shifts, and in some cases, it can resolve data for cases in which the fiber microstructure slowly varies over time. However, if a single scan produces a low-quality result or has some other issue, the error introduced during that scan is propagated to all other scans. Therefore, the running reference method is not particularly robust or able to recover from erroneous scans.

The results presented in this paper show example cases in which the initial and immediately previous scans are no longer appropriate references and cannot be used to calculate spectral shifts with sufficiently high quality (FIGS. 11B, 12B, and 13B). The external influences to which the fibers were subjected in this work can be generalized into two categories. The first category includes influences such as large strains that require significant shifts of the reference spectrum to align it with the target spectrum. The Rayleigh backscatter signal is a relatively weak signal, which is always subject to some degree of noise that can lead to a misidentified shift of the reference spectrum that produces a higher degree of overlap with the target spectrum. Increasing strains result in larger spectral shifts that increase the likelihood that the cross-correlation misidentifies the true spectral shift.

The second category for the applied external influences evaluated in this work includes the effects of temperature and radiation damage, which can change the distribution of defects within the fiber that establish its unique Rayleigh backscatter signature. High temperatures are known to increase the mobility of diffusing species, which can react with the $SiO_2$ network or passivate existing defects. Similarly, ionizing radiation can cause displacement damage and bond cleavage, which can create new point defects or ionize existing defects. Without varying the reference scan, it would be impossible to accurately determine the spectral shift after the defect distribution is altered.

The inchworm algorithm attempts to resolve the trade-off between resolution, error propagation, and robustness by making a more informed decision for how to vary the reference OFDR scan when calculating spectral shift. It functions identically to the static reference until it encounters a target scan that does not produce a sufficiently high-quality result when compared with the static reference. The inchworm algorithm then attempts to use the running reference to resolve the spectral shift from the target scan and allows the reference to be changed only if needed to mitigate the effects of compounding measurement errors. If this is unsuccessful, then the algorithm attempts to use all previous scans as a reference until the initial scan is reached. Through this method of limiting low-quality data, the inchworm algorithm defaults to the static reference method and minimizes the error associated with the measurement. The result is an algorithm that, for the cases evaluated in this paper, produces higher qualities (FIGS. 11D, 12D, and 13D), and it also increases the range of temperature and neutron fluence that can be accurately resolved using OFDR.

The benefits of the inchworm algorithm come at the cost of increased processing time. In principle, a lower acceptance criterion $\zeta$ could be used to decrease the processing time by allowing the algorithm to use a static reference for a larger portion of the data set. However, a lower $\zeta$ increases the potential for erroneous spectral shift values from combinations of reference and target scans that are not well correlated (i.e., lower values of $\max\{I_r \otimes I_t\}$). Similarly, using a stricter (larger) value for $\zeta$ would reduce the likelihood of erroneous spectral shift determinations at the expense of increased processing time. In the worst case, the quality for all scans would not meet the acceptance criterion for any combination of target and reference scan. In this case, each target scan n would be compared with n references before defaulting to the static reference ($\alpha=0$), resulting in a total of $$\sum_{n=1}^{N} n$$

sets of spectral shift calculations, compared to N calculations for the static reference method. However, in this scenario, there likely would be no algorithm capable of producing a combination of target and reference scans that would satisfy the strict $\zeta$ value. The inchworm algorithm can compare each scan with all possible scans, giving it the best chance of producing a reliable combination of target and reference scans.

Other algorithms for identifying the most appropriate mapping of a large set of measurements have been developed for applications outside of OFDR and could potentially be adopted for OFDR measurements. For example, maximum spanning tree (MST) algorithms could be used to maximize the quality of the reconstructed spectral shift data at the cost of increased complexity and computational expense by comparing all target scans with all forward- and backward-looking reference scans. By taking this one step further, the comparisons could be performed separately for each sensing location along the fiber. Theoretically, such algorithms could determine the best possible reference for all locations and all target scans to maximize quality. However, this would dramatically increase the processing time, and it could introduce artifacts through using different references for different locations within the same target scan. The inchworm algorithm uses an assumption of causality and a sufficiency condition to decrease the reference-target space. First, rather than comparing each target scan with all possible reference scans, as in the MST, the inchworm algorithm only uses OFDR scans obtained up to the target scan as reference scans. Second, the inchworm algorithm allows the reference scan to be varied if and only if the resulting spectral shift calculations are of a sufficiently high quality (min $(Q'_{a,n}(x)=\zeta)$. While the inchworm algorithm does not guarantee the maximum quality mapping between target and reference scans when reconstructing the spectral shift measurements (as does the MST), it provides the weaker guarantee that error is propagated if and only if changing the reference scan will result in a measurement of sufficiently high quality. In practice, these simplifications reduced the time required for the inchworm algorithm analyses to 4-30 hours for the reported data, which is still significantly greater than <1 hour for the naive methods.

H. Select Conclusions in the Context of OFDR Data

OFDR measurements can provide high-resolution spatially distributed measurements of temperature and strain along an optical fiber for monitoring process control applications. This is accomplished by relying on the random but static nature of the Rayleigh backscattered signature that is unique to each fiber. It also allows for analysis of local changes in the reflected light spectrum relative to an initial reference. However, the traditional static reference approach used to process OFDR data to obtain temperature or strain measurements limits the applications for these measurements. This is because of the naive nature of the static reference approach and its inability to capture slow changes in the microstructure of the optical fiber that ultimately change the Rayleigh backscatter signature. Some examples in which processing of OFDR data with a static reference approach failed to yield reliable spectral shift data include exposure to high temperatures, large strains, and neutron irradiation. In this work, the inchworm algorithm was developed to vary the reference measurement to which each target scan is compared. This approach is similar to a previously established running reference method. However, in the inchworm algorithm, the reference is varied in a more sophisticated manner based on a quality metric that determines how well the target and reference scan are correlated. Three case studies were used to test the inchworm algorithm: (1) a freely suspended fiber heated to temperatures up to 950° C., (2) a constrained optical fiber embedded in aluminum and heated to temperatures as high as 500° C., and (3) an optical fiber tested in a nuclear reactor with a total neutron flux of $2.9\times10^{13}$ n/cm$^2$/s over five days. Compared to previously proposed algorithms, the inchworm algorithm is shown to (1) improve the functional range of temperature and neutron fluence over which OFDR sensors can operate, (2) better identify low-quality data, and (3) increase the resolvable spectral shift range. Because the inchworm algorithm was designed to be a drop-in replacement for the static reference algorithm, it could be used to provide new insights into previous data sets that were deemed unusable. In addition, because the algorithm can resolve slow changes in the fiber's microstructure, it could potentially be used to improve the fundamental understanding of fiber degradation processes such as high-temperature thermal annealing and displacement damage from neutron irradiation.

Although the present invention may be implemented using a wide variety of alternative algorithms, pseudocode for implementing the method steps of one embodiment of the inchworm algorithm is shown in FIG. 14.

The terms "comprising" or "comprise" are used herein in their broadest sense to mean and encompass the notions of "including," "include," "consist(ing) essentially of," and "consist(ing) of. The use of "for example," "e.g.," "such as," and "including" to list illustrative examples does not limit to only the listed examples. Thus, "for example" or "such as" means "for example, but not limited to" or "such as, but not limited to" and encompasses other similar or equivalent examples. The term "about" as used herein serves to reasonably encompass or describe minor variations in numerical values measured by instrumental analysis or as a result of sample handling. Such minor variations may be in the order of ±0-10, ±0-5, or ±0-2.5, % of the numerical values. Further, the term "about" applies to both numerical values when associated with a range of values. Moreover, the term "about" may apply to numerical values even when not explicitly stated.

Generally, as used herein a hyphen "-" or dash "-" in a range of values is "to" or "through"; a ">" is "above" or "greater-than"; a "≥" is "at least" or "greater-than or equal to"; a "<" is "below" or "less-than"; and a "≤" is "at most" or "less-than or equal to." For the avoidance of doubt, when ranges are presented, including in chemical compositions, the ranges are inclusive of the high and low values defining the range.

On an individual basis, each application for patent, patent, and/or patent application publication, identified herein is expressly incorporated herein by reference in its entirety in one or more non-limiting embodiments.

Any ranges and subranges relied upon in describing various embodiments independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The invention claimed is:

1. A system comprising:

a data processing apparatus communicatively coupled with an optical frequency domain reflectometry (OFDR) system that is configured to determine a spectrum of light that had been launched into an optical fiber from a tunable laser source and then backscattered by refractive index variations within a segment of the optical fiber; and memory communicatively coupled with the data processing apparatus, the memory encoding instructions that, when executed by the data processing apparatus, cause the system to perform operations comprising:

receiving, from the OFDR system, a respective timed sequence of backscattered-light spectra associated with each segment of the optical fiber; and determining, for each optical-fiber segment, a set of values of a temperature or a strain of the optical-fiber segment corresponding to the received timed sequence of the backscattered-light spectra by performing operations comprising:

selecting, for each backscattered-light spectrum of the timed sequence, a path of connected reference spectra from among two or more earlier backscattered-light spectra of the timed sequence by (i) determining, for a plurality of candidate paths of connected reference spectra, respective cumulative quality values based on graph radius path length between a root spectrum and the backscattered-light spectrum, the cumulative quality values being derived from quality values of pairings along paths connecting the root spectrum to the backscattered-light spectrum, and (ii) selecting the path of connected reference spectra as one of the candidate reference spectra having a cumulative quality value that satisfies a selection criterion, determining a spectral shift between the backscattered-light spectrum and the path of connected reference spectra, and determining a value of the temperature or the strain of the optical-fiber segment based on the spectral shift.

2. The system of claim 1, wherein the operation of determining the spectral shift comprises calculating a shift of the backscattered-light spectrum relative to the reference spectrum.

3. The system of claim 1, wherein the optical fiber is disposed in a harsh environment that comprises neutron irradiation.

4. The system of claim 1, wherein the data processing apparatus is implemented as one of a microprocessor, an FPGA, or an ASIC.

5. The system of claim 1, wherein the backscattered-light spectra are represented as nodes in a graph, the graph including edges between the nodes, the edges corresponding to pairings of backscattered-light spectra and being weighted by quality values, and the cumulative quality values being determined based on paths through the graph that connect the backscattered-light spectrum to a root spectrum.

6. A system comprising:

a data processing apparatus communicatively coupled with an optical frequency domain reflectometry (OFDR) system that is configured to determine a spectrum of light that had been launched into an optical fiber from a tunable laser source and then backscattered by refractive index variations within a segment of the optical fiber, wherein the optical fiber is disposed in an environment that comprises neutron irradiation or temperatures of at least 750° C.; and memory communicatively coupled with the data processing apparatus, the memory encoding instructions that, when executed by the data processing apparatus, cause the system to perform operations comprising:

receiving, from the OFDR system, a respective timed sequence of backscattered-light spectra associated with each segment of the optical fiber; and determining, for each optical-fiber segment, a set of values of a temperature or a strain of the optical-fiber segment corresponding to the received timed sequence of the backscattered-light spectra by performing operations comprising:

selecting, for each backscattered-light spectrum of the timed sequence, a reference spectrum from among two or more earlier backscattered-light spectra of the timed sequence by determining, in reverse chronological order, a quality value based on a pairing of the backscattered-light spectrum and one of the earlier backscattered-light spectra, the selected reference spectrum corresponding to the first quality value determined to meet or exceed a predetermined threshold, the earlier backscattered-light spectra comprising all earlier backscattered-light spectra of the timed sequence, determining a spectral shift between the backscattered-light spectrum and the reference spectrum, and determining a value of the temperature or the strain of the optical-fiber segment based on the spectral shift.

7. A system comprising:

a data processing apparatus communicatively coupled with an optical frequency domain reflectometry (OFDR) system that is configured to determine a spectrum of light that had been launched into an optical fiber from a tunable laser source and then backscattered by refractive index variations within a segment of the optical fiber, wherein the optical fiber is disposed in an environment that comprises neutron irradiation or temperatures of at least 750° C.; and memory communicatively coupled with the data processing apparatus, the memory encoding instructions that, when executed by the data processing apparatus, cause the system to perform operations comprising:

receiving, from the OFDR system, a respective timed sequence of backscattered-light spectra associated with each segment of the optical fiber; and determining, for each optical-fiber segment, a set of values of a temperature or a strain of the optical-fiber segment corresponding to the received timed sequence of the backscattered-light spectra by performing operations comprising:

selecting, for each backscattered-light spectrum of the timed sequence, a reference spectrum from among two or more earlier backscattered-light spectra of the timed sequence by determining a quality value based on a pairing of the backscattered-light spectrum and one of the earlier backscattered-light spectra, the selected reference spectrum having a highest quality value from among the determined quality values, the earlier backscattered-light spectra comprising all earlier backscattered-light spectra of the timed sequence, determining a spectral shift between the backscattered-light spectrum and the reference spectrum, and determining a value of the temperature or the strain of the optical-fiber segment based on the spectral shift.

* * * * *